Jan. 9, 1923.
E. A. KELLY.
FLOWING DEVICE.
FILED AUG. 5, 1921.
1,441,428.
2 SHEETS—SHEET 2.
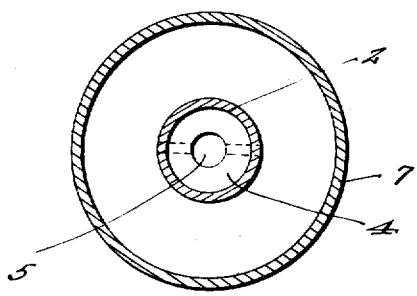
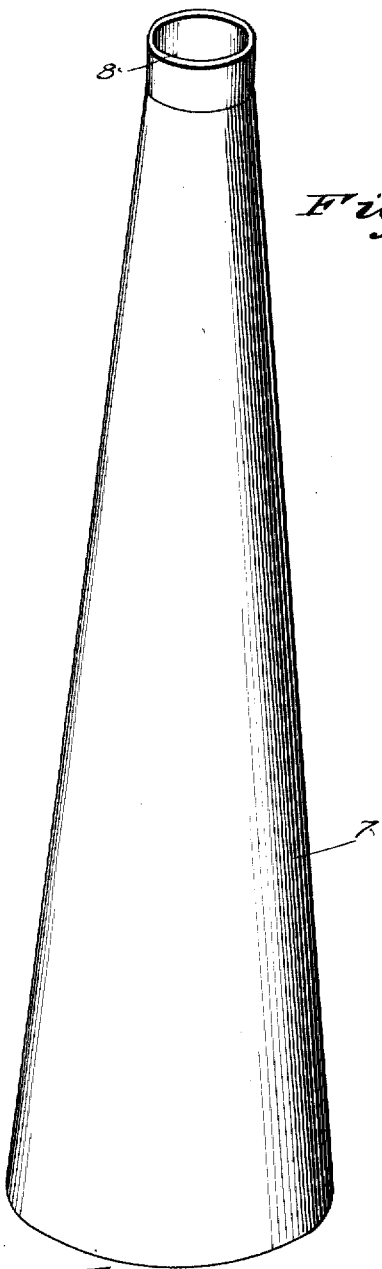
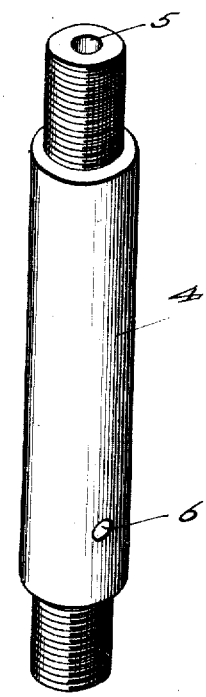
E. A. Kelly, INVENTOR
BY Victor J. Evans, ATTORNEY Patented Jan. 9, 1923.

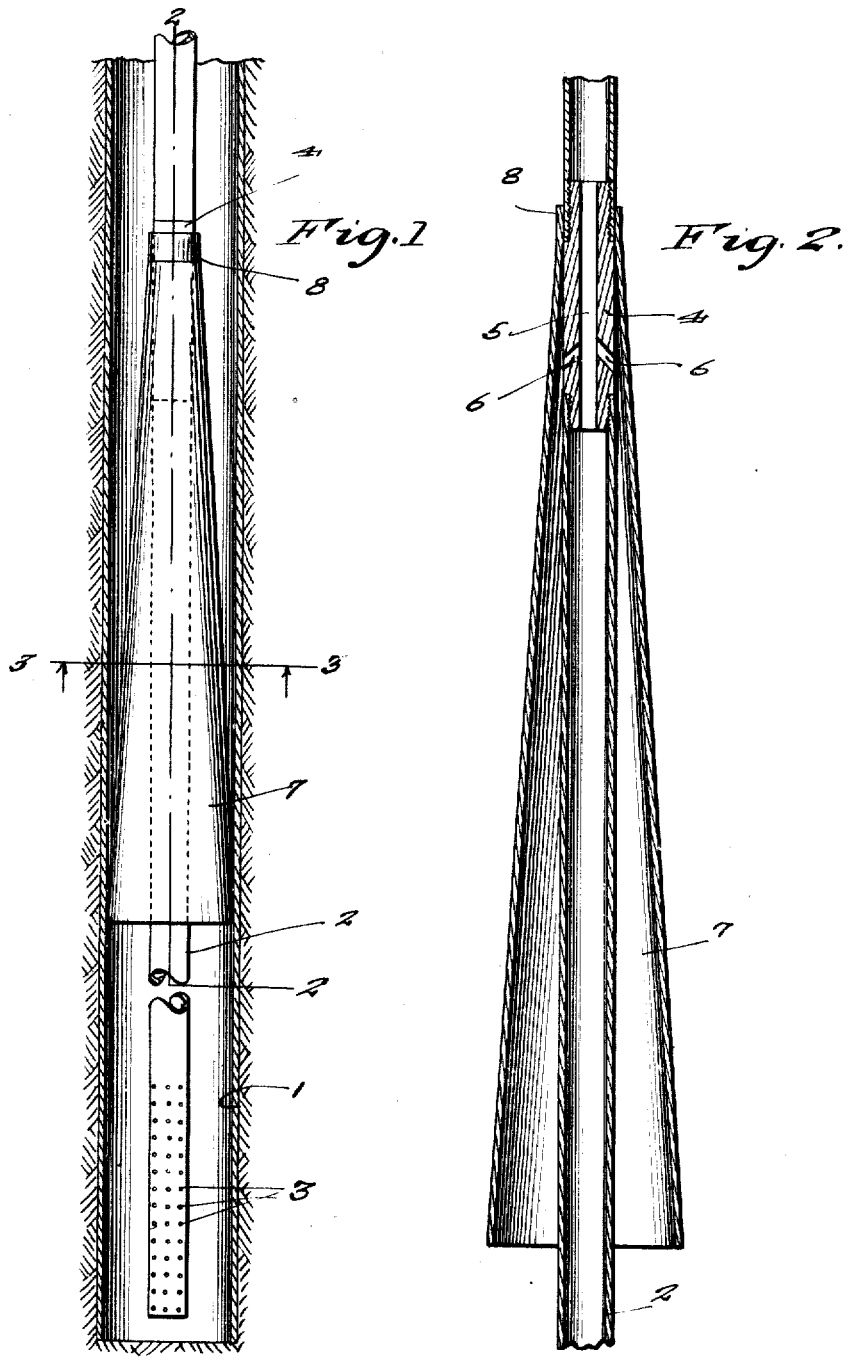

1,441,428

UNITED STATES PATENT OFFICE.

EUGENE A. KELLY, OF BRECKENRIDGE, TEXAS.

FLOWING DEVICE.

Application filed August 5, 1921. Serial No. 490,004.

*To all whom it may concern:*

Be it known that I, EUGENE A. KELLY, a citizen of the United States, residing at Breckenridge, in the county of Stephens and State of Texas, have invented new and useful Improvements in Flowing Devices, of which the following is a specification.

In carrying out the present invention it is my purpose to provide a flowing device for oil wells whereby the employment of pumping apparatus will be eliminated and the well flowed by the gas therein.

It is also my purpose to provide a flowing device for oil wells which will operate on the principle of an injector and which will be constructed in such manner as to increase the velocity of the gas issuing from the well or of the compressed air that may be delivered to the well, so that such gas or compressed air, as the case may be, will exert a lifting force upon the oil and water, if any there be, in the well, so as to flow the liquid from the well, thereby enabling the water and oil to be flowed off together and prolonging the life of the well.

With the above recited objects in view, and others of a similar nature, the invention resides in the construction, combination, and arrangement of parts set forth in and falling within the scope of the appended claims.

In the drawings:—

Figure 1 is a sectional view through an oil well casing having my improvement applied to the tube therein.

Figure 2 is a sectional view on the line 2—2 of Figure 1.

Figure 3 is a sectional view on the line 3—3 of Figure 1.

Figure 4 is a perspective view of the atomizer.

Figure 5 is a similar view of the funnel or cone-shaped attachment.

Referring now to the drawings in detail, the numeral 1 designates a casing for an oil well, and 2 the tube through which the oil flows. The tube is arranged centrally in the casing and is, of course, of a distinctly less circumference than that of the casing. The lower end of the tube 2 extends into the oil bearing sand or strata at its lower end and is formed with apertures 3 or is otherwise equipped to take in the oil.

The tube 2 is made up of sections of the desired or necessary lengths and these lengths of the tubing are connected together by suitable unions or couplings, as is well known.

In accordance with my invention, and as an essential part thereof, the tubing 2 at an appropriate or advantageous point in its length has inserted therein a short pipe section 4 of the necessary length and formed with a restricted bore or passage 5 of less diameter than the diameter of the tubing and in axial alinement with the tubing. In the present instance, the ends of the pipe section 4 are threaded into the adjoining ends of the tubing, as clearly illustrated in Figure 2. This short length of pipe 4 at a propitious point in its length is formed with injector ports 6 which, in the present instance, incline upwardly from the outer diameter of the pipe 4 to the bore 5 and have their outer ends opening onto the outer wall of the pipe section 4 and the inner ends opening into the restricted bore 5. In this form of my invention I show but two bores 6, and these are diametrically opposed to each other, as clearly illustrated in Figure 2 of the drawings. Also surrounding the pipe section 4 is a truncated cone-shaped apron 7, the upper restricted end of which engages the pipe section 4 of the tubing above the injector ports 6, while the lower or relatively large end is arranged a suitable distance below the injector ports 6. The outer wall of the apron 7 at its lower end engages the inner wall of the well casing 1, as clearly illustrated in Figure 1 of the drawings, so as to form a more or less liquid-tight joint.

In the practice of my invention, the pipe section 4 and the apron are associated with the tubing 2 at the most propitious point in the length of the tubing and the gas given off by the well flows upwardly through the casing and is confined in the apron 7 and delivered by the apron 7 to the injector ports 6. The gas in flowing through the ports 6 and into the restricted passage or bore 5 increases in velocity, thereby creating a partial vacuum below the ports 6 and exerting a lifting power on the oil or oil and water, as the case may be, in the tubing 2, with the effect to flow the oil upwardly through the tubing and onto the surface. By reason of the injector ports a continuous flow through the tubing is produced in contradistinction to an intermittent or pulsating flow, as is produced by some flowing devices with which I am acquainted.

From the number of wells that I have brought back to a producing basis and the number of wells that I am flowing at the present time by reason of my invention, I find that my improved flowing device not only increases production and prolongs the life of the well, but also produces the well constantly, flows off the water and oil together and does not cut the oil. Furthermore, my experience has been that my flowing device keeps the water off the sand, flows the water off of gas wells and flows off floating sand as made, thereby keeping the well clean, as well as reducing paraffin trouble. As my improved flowing device is absolutely automatic in operation and requires very little, if any, attention, I find that it can be installed and maintained at small expense and will produce a continuous and uninterrupted flow of oil as distinguished from a pulsating or intermittent flow, as is now done with some flowing devices with which I am acquainted.

While I have herein shown and described one preferred form of my invention by way of illustration, I wish it to be understood that I do not limit or confine myself to the precise details of construction herein shown and described, as modifications and variations may be made as fall within the scope of the claims and without departing from the spirit of my invention.

Having described the invention, I claim:—

1. In a well flowing device, the combination with the tubing, of a tubular section inserted in the tubing at a propitious point in its length and formed with a bore and with upwardly inclined injector ports communicating with the bore and with the well, of an apron of truncated cone-shape having its upper small end encircling said tubular section above said injector ports and its lower large end arranged below said injector ports whereby the gas may be confined and directed through said injector ports to flow the well.

2. In a well flowing device, the combination with a tubing and a well casing, of a tubular section inserted in the tubing at a propitious point in its length and formed with a bore and with upwardly inclined injector ports communicating with the bore and with the well casing, of an apron of truncated cone-shape having its upper small end encircling said tubular section above said injector ports and its lower large end arranged below said injector ports and substantially contacting with the well casing whereby the gas may be confined and directed through said injector ports to flow the well.

3. In a device of the class described, in combination with a well casing, a suction pipe disposed in the said well casing, a funnel-shaped member to close the space in the said casing outside of the suction pipe for accumulating and condensing gas within the said well casing outside of the said suction pipe, and means forming a jet discharge from a point below the funnel-shaped member into and through the suction pipe.

In testimony whereof I affix my signature.

EUGENE A. KELLY.